United States Patent
Self

(10) Patent No.: US 7,438,518 B2
(45) Date of Patent: Oct. 21, 2008

(54) GAS TURBINE NOZZLE GUIDE VANE

(75) Inventor: Kevin Paul Self, Bristol (GB)

(73) Assignee: Rolls-Royce plc, London (GB)

( * ) Notice: Subject to any disclaimer, the term of this patent is extended or adjusted under 35 U.S.C. 154(b) by 588 days.

(21) Appl. No.: 11/065,114

(22) Filed: Feb. 24, 2005

(65) Prior Publication Data

US 2005/0186075 A1    Aug. 25, 2005

(30) Foreign Application Priority Data

Feb. 24, 2004    (GB)    ................... 0403973.1

(51) Int. Cl.
  *F01D 9/02*    (2006.01)
(52) U.S. Cl. .................... 415/115; 415/191; 416/223 A
(58) Field of Classification Search ................ 415/191, 415/12, 210.1; 416/223 A
See application file for complete search history.

(56) References Cited

U.S. PATENT DOCUMENTS

| | | | |
|---|---|---|---|
| 1,347,003 A | * 7/1920 | Baumann et al. | ............ 415/191 |
| 3,990,810 A | * 11/1976 | Amos et al. | ............ 415/161 |
| 4,705,452 A | * 11/1987 | Karadimas | ............ 415/115 |
| 5,215,431 A | 6/1993 | Derrien | |
| 5,545,002 A | 8/1996 | Bourguignon et al. | |
| 6,200,092 B1 | * 3/2001 | Koschier | ............ 415/191 |
| 2002/0164250 A1 | 11/2002 | Chung et al. | |

FOREIGN PATENT DOCUMENTS

| | | |
|---|---|---|
| GB | 316381 | 8/1929 |
| GB | 791751 | 3/1958 |
| GB | 847359 | 9/1960 |
| GB | 2 395 235 A | 5/2004 |
| JP | A 11-336504 | 12/1999 |
| RU | 1 152 289 A1 | 12/1995 |

\* cited by examiner

*Primary Examiner*—Richard Edgar
(74) *Attorney, Agent, or Firm*—Oliff & Berridge, PLC

(57) ABSTRACT

A nozzle guide vane for a gas turbine comprises at least one aerofoil having a leading edge section provided with at least one internal cavity for conveying cooling fluid through the said leading edge section, and a plate like wall section extending from the leading edge section to provide a continuous surface between the aerofoil leading edge section and the aerofoil trailing edge on the suction side of the aerofoil.

12 Claims, 1 Drawing Sheet

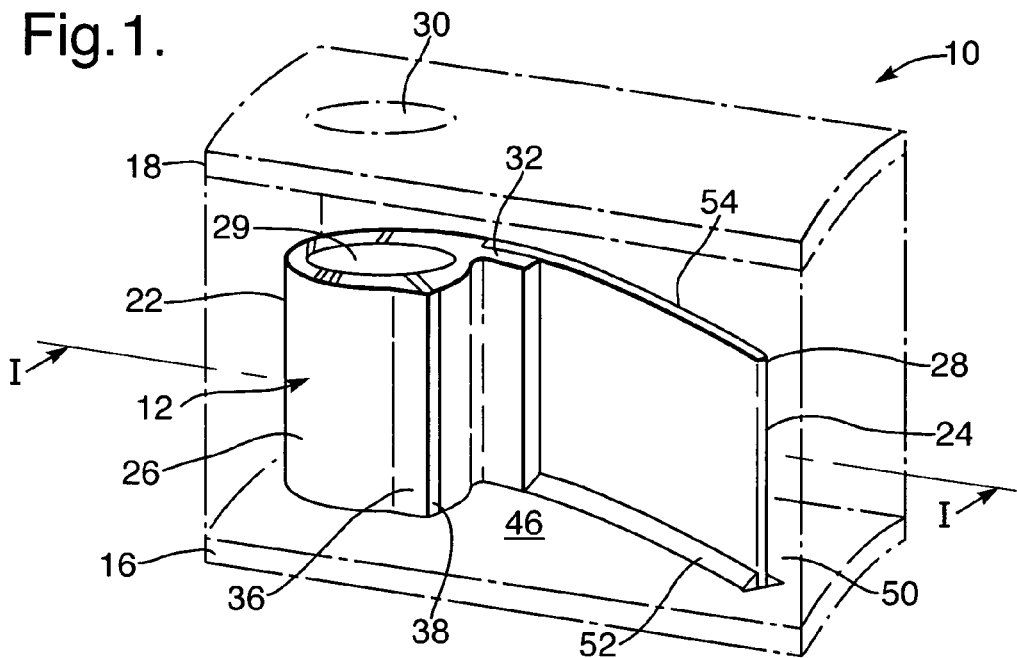
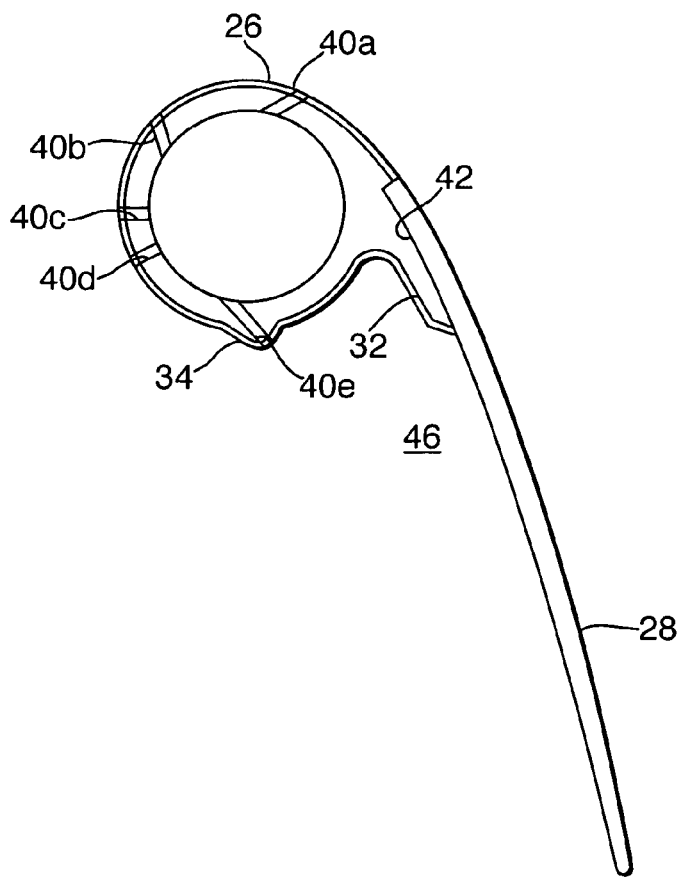

GAS TURBINE NOZZLE GUIDE VANE

This invention relates to nozzle guide vanes for gas turbine engines, and in particular concerns turbine nozzle guide vanes for high temperature engine applications.

The thermal efficiency of the jet engine cycle is directly related to the turbine entry temperature of the cycle and in modern gas turbine engines turbine entry temperatures are usually in excess of the melting point of the metal alloy material of the turbine components. Such high operating temperatures are only possible with some form of component cooling and typically nozzle guide vane and turbine rotor blade aerofoils are provided with internal passages or cavities through which cooling air bled from the engine compressor is directed to cool these components. The cooling passages or cavities direct cooling air through single or multi-pass channels in the aerofoil with some of the cooling air being exhausted from the internal passages through film cooling holes or trailing edge slots provided in the aerofoil walls. Film cooling holes and slots provide additional cooling of the external aerofoil surfaces where the exiting cooling air provides a thin film of relatively cool air over the aerofoil surface to protect the aerofoil from the effects of the high temperature turbine gases which flow over these surfaces in use.

As turbine entry temperatures have increased it has because necessary to use greater amounts of cooling air bled from the engine compressor. However, it is well recognised that there is a limit to the amount of cooling air that may ultimately be used for turbine cooling because of the impact of increased bleed flow on engine cycle efficiency and increased smoke and/or noxious gases emissions which are a further consequence of increasing the compressor bleed flow.

A typical cooling arrangement for a nozzle guide vane for a high pressure turbine is described in GB-A-2,163,218. In this typical arrangement the external shape of the aerofoil cross-section is defined by a continuous wall which provides a gas flow boundary on both the pressure and suction sides of the aerofoil between the leading and trailing edges thereof. The internal region of the aerofoil cross-section is partitioned by one or more webs to provide discrete internal passages for the flow of cooling air and also to increase the structural rigidity of the aerofoil cross-section. The thickness of the outer aerofoil wall is principally determined by structural and oxidation resistance considerations, the latter principally to prevent perforation of the wall due to oxidation of the component material in use.

One of the main disadvantages of known nozzle guide vane arrangements is the requirement to maintain the material of the vane below certain critical temperatures in order to obtain an acceptable oxidation life of the nozzle guide vane component. As mentioned above, as engine temperatures increase more cooling air is required to maintain the turbine components at certain acceptable temperatures. Ultimately, however, the benefits of increasing the gas temperature will be countered by the disadvantages of increasing the amount of air bled from the compressor for cooling. A new approach to nozzle guide vane design is therefore required.

According to an aspect of the present invention there is provided a nozzle guide vane for a gas turbine, the vane comprising at least one aerofoil having a leading edge section provided with at least one internal cavity for conveying cooling fluid through the said leading edge section and a plate like wall section extending from the leading edge section to provide a continuous surface between the aerofoil leading edge section and the aerofoil trailing edge on the suction side of the aerofoil.

In the above mentioned aspect of the invention the plate preferably constitute the whole of the aerofoil downstream of the leading edge section such that the downstream edge of the plate provides the aerofoil trailing edge. In this simplified arrangement the airflow cooling requirement of the aerofoil is reduced at the expense of aerofoil aerodynamic efficiency. The nozzle guide vane aerofoil of the present invention has a reduced aerodynamic efficiency because the plate section defines only one aerodynamic surface (suction surface) of the aerofoil. The other aerodynamic surface (pressure surface) which would otherwise be defined by a pressure surface wall on the other side of the aerofoil between the leading edge section and the training edge is, in this aspect of the present invention, effectively dispensed with. Gas flow incident upon the leading edge section of the vane is therefore deflected by the vane in a less efficient way than would otherwise occur with a vane having both pressure and suction side aerodynamic surfaces. The relatively simple arrangement of the nozzle guide vane aerofoil according to this aspect of the invention provides a relatively lightweight component having reduced cooling flow requirements. The amount of cooling air required for an aerofoil of the aforementioned type is significantly less then hitherto known nozzle guide vane aerofoils where both the pressure and suctions surface walls are cooled by cooling air flowing in internal cavities between the walls.

The plate section may also define an external cavity on the pressure side of the aerofoil between the leading edge section and the aerofoil trailing edge. The external cavity effectively occupies the region between the leading edge section and the trailing edge on the pressure side of the aerofoil, essentially the region that would otherwise be bounded by the aerofoil pressure surface wall extending between the leading edge section and the trailing edge.

The plate section and leading edge section are preferably formed as separate parts and joined together, and in preferred embodiments these two sections of the aerofoil comprise different materials so that different materials may be selected to optimise the performance characteristics, including operational life, of the aerofoil section. For example, while the leading edge section may comprise a cast high temperature nickel alloy material the plate section may comprise a composite material such as a metal-ceramic matrix composite capable of operating in very high temperature gas streams without cooling.

Preferably, the plate section is joined along its upstream edge to a corresponding downstream part of the leading edge section.

In preferred embodiments the upstream edge of the plate section forms an overlapping joint with the corresponding downstream part of the leading edge section to which it is joined. The overlapping joint provides for greater structural integrity of the joined parts and may assist location of parts to be joined before they are actually joined together.

It preferred embodiments the plate section is joined to, and extends downstream from, the aerofoil suction surface side of the leading edge section. This in combination with the other preferred features previously recited provides for a smooth aerodynamic transition between the leading edge section and the plate section on the suction surface side of the aerofoil.

The plate section and leading edge section of the aerofoil may be joined together by mechanical fixing means, a chemical bond or by welding depending upon the materials of the respective parts.

In preferred embodiments the leading edge section is integrally formed, preferably integrally cast, with the inner and outer aerofoil platforms of the nozzle guide vane that are positioned adjacent to and generally perpendicular to the aerofoil. In this way the whole of the nozzle guide vane, less the plate section, can be cast as an integral structure using techniques well known in the art. This readily enables the aerodynamic loads of the aerofoil to be transferred to other turbine support structure components via the nozzle guide vane platforms. Preferably the leading edge section also comprises a lip portion in the form of an external surface protuberance positioned at or towards its downstream end on the pressure side of the aerofoil. This can improve the aerodynamic efficiency of the aerofoil by providing a natural separation point on the pressure side surface of the leading edge section at the downstream end thereof. The lip preferably acts to direct the gas flow on the pressure side surface of the leading edge section towards the trailing edge of the aerofoil.

In preferred embodiments the lip portion extends along the spanwise length of the aerofoil and is provided with a plurality of film cooling holes for conveying cooling fluid from the internal cavity of the leading edge section to the external surface of the lip.

An embodiment of the present invention will now be more particularly described, by way of example only, with reference to the accompanying drawings, in which:

FIG. 1 is a perspective view of a nozzle guide vane segment for a gas turbine engine according to an embodiment of the present invention; and FIG. 2 is a cross-section view of the aerofoil shown in FIG. 1 along line I-I in FIG. 1.

In a turbine stage of the turbine section in a gas turbine engine there is provided an array of nozzle guide vane segments circumferentially spaced about the engine axis to define an annular gas flow passage between radially inner and outer vane platforms, Aerofoil sections extended across the gas flow passage, in a radial direction, substantially perpendicular to the platforms. Each array of nozzle guide vanes is arranged immediately upstream of a corresponding array of turbine rotor blades such that turbine gases that flow between the aerofoil sections of the nozzle guide vanes are directed at an appropriate angle onto the turbine rotor blade aerofoils.

Referring to FIG. 1, a single vane nozzle guide vane segment 10 comprises And aerofoil section 12 sandwiched between inner and outer vane platforms 16 and 18. The aerofoil section 12 spans the gap between the inner and outer platforms which constitute part of the turbine gas flow passage between the platforms of respectivesegments in a turbine stage of a gas turbine engine. In the drawing of FIG. 1 the radially outer platform 18 is shown detached from the radially outer spanwise extremity of the aerofoil 12. It is to be understood that this representation of the nozzle guide vane segment is for the purpose of illustration only and that in practice the outer platform 18 is joined to the aerofoil section 12 in the same way that it is shown joined to the inner platform 16 in the drawing of FIG. 1.

The aerofoil section includes a leading edge 22 at the upstream end of the nozzle guide vane segment (the left of the drawing in FIG. 1) and a trailing edge 24 at the downstream end of the vane segment (to the right of the drawing in FIG. 1).

The aerofoil section 12 comprises two parts including a leading edge section 26 and a downstream plate like wall section 28 which extends from the leading edge section, in a downstream direction, to provide a continuous aerofoil suction surface between the aerofoil leading edge section 26 and the trailing edge 24.

The leading edge section 26 is in the form of a generally circular cross-section tube having a substantially constant wall thickness with the interior of the hollow leading edge section providing an internal cavity 29 for conveying cooling fluid admitted into the cavity through apertures 30 in the inner and outer platforms from respective plenum regions (not shown) on the underside of the vane inner platform and the radially outer side of the outer platform for cooling the walls of the tubular leading edge section 26.

The leading edge section 26 is provided with a flange portion 32 which extends in a downstream direction on the suction surface side of the aerofoil. The flange 32 is generally tangential to the main cylindrical part of the leading edge section and extends in the spanwise direction of the aerofoil between the inner and outer platforms. The downstream extremity of the leading edge section on the pressure surface side of the aerofoil is provided with a surface discontinuity in the form of a protuberance which defines a lip 34 which extends along the spanwise length of the aerofoil. The lip 34 comprises a pair of mutually perpendicular flat adjoining surfaces 36 and 38 on the external surface of the leading edge section. The first surface is generally tangential to the approximately circular external surface of the upstream part of the leading edge section and the surface 38 faces towards the plate section 28. A plurality of columns of film cooling holes 40a to 40e are provided in the leading edge section for conveying cooling air from the internal cavity 29 to the external surface of the leading edge section. Cooling holes 40e are spaced along the flat surface 38 for generating a film of cooling air over the downstream portion of the leading edge section between the lip and the flange 32.

The plate section 28 has a slight curvature with its convex face disposed on the suction side of the aerofoil. The plate section 28 is located in a recessed region 42 in the external surface of the leading edge section in the region of the flange 32. The recess 42 has a depth dimension corresponding to the thickness dimension of the plate 28 such that the forward or upstream edge of the plate locates in the recess 42 to provide a substantially continuous surface on the pressure side of the aerofoil between the leading edge section and the downstream trailing edge 24 of the plate substantially free of surface discontinuities.

The region bounded by the plate 24 and the downstream part of the leading edge section between the flange 32 and the lip 34 comprises an open external cavity 46 on the pressure side of the aerofoil.

The leading edge section 26 is integrally cast with the inner and outer platforms 16 and 18 while the plate 28 is formed separately from a different material, preferably a high temperature metal-ceramic matrix composite. The cast part of the nozzle guide vane, that is the leading edge section 26 and platforms 16 and 18, preferably comprise a high temperature nickel alloy material. Depending upon the choice of materials for the cast part and the plate 28, the two parts are joined together at the overlapping joint defined by the recess 42 and flange 32 by welding, by chemical bonding or mechanical fixing means. For example, as shown in the drawing of FIG. 1, the edge of the plate adjacent to the inner platform is located in a channel 50 formed in a surface protrusion 52 which extends between the trailing edge 24 and the downstream extremity of the flange 32 to fix the plate 28 relative to the cast part of the vane. In preferred embodiments the upper or radially outer edge 54 of the plate section is also located in a corresponding channel provided in a similar surface protrusion in the adjacent surface of the outer platform 18. In this way the plate 28 defines an encastré beam which supports the gas loads acting on the plate during engine operation.

Although the invention has been described with reference to the embodiment shown in the accompanying drawings, it is to be understood that the invention is not limited to that precise embodiment and that various changes and modifications may be effected without further inventive skill and effort.

The invention claimed is:

1. A nozzle guide vane for a gas turbine, the vane comprising at least one aerofoil consisting essentially of:
 a leading edge section provided with at least one internal cavity for conveying cooling fluid through the said leading edge section; and
 a plate like wall section extending from a recessed flange region in the external surface of the leading edge section to provide a continuous surface between the aerofoil leading edge section and the aerofoil trailing edge on the suction side of the aerofoil;
 the plate like wall section and leading edge section being separate parts of different materials and contiguously joined together.

2. A nozzle guide vane as claimed in claim 1 wherein the plate section defines an external cavity on the pressure side of the aerofoil between the said leading edge section and the aerofoil trailing edge.

3. A nozzle guide vane as claimed in claim 1 wherein the plate section is joined along its upstream edge to a corresponding downstream part of the leading edge section.

4. A nozzle guide vane as claimed in claim 3 wherein the upstream edge of the plate section forms an overlapping joint with the said corresponding downstream part of the leading edge section.

5. A nozzle guide vane as claimed in claim 1 wherein the plate section is joined to and extends downstream from the aerofoil suction surface side of the leading edge section.

6. A nozzle guide vane as claimed in claim 1 wherein the plate section and leading edge section are joined by welding, mechanical fixing means or a chemical bond.

7. A nozzle guide vane as claimed in claim 1 wherein the leading edge section is integral with inner and/or outer aerofoil platforms adjacent to and generally perpendicular to the aerofoil.

8. A nozzle guide vane as claimed in claim 7 wherein the aerofoil leading edge section and the aerofoil platform or platforms comprise an integrally cast structure.

9. A nozzle guide vane as claimed in claim 1 wherein the plate section comprises a metal-ceramic composite or other composite material.

10. A nozzle guide vane as claimed in claim 1 wherein the leading edge section comprises a lip portion in the form of an external surface protuberance at or towards its downstream end on the pressure side of the aerofoil.

11. A nozzle guide vane as claimed in claim 10 wherein the said lip portion extends along the spanwise length of the aerofoil.

12. A nozzle guide vane as claimed 11 wherein the leading edge section is provided with a plurality of film cooling holes in the said lip portion for conveying cooling fluid from the said internal cavity on to the external surface of the lip.

* * * * *